(12) United States Patent
Tanaka et al.

(10) Patent No.: US 11,027,775 B2
(45) Date of Patent: Jun. 8, 2021

(54) WHEEL LOADER

(71) Applicant: HITACHI CONSTRUCTION MACHINERY CO., LTD., Tokyo (JP)

(72) Inventors: Shinichiro Tanaka, Akashi (JP); Hiroyasu Kodera, Kobe (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/640,363

(22) PCT Filed: Mar. 5, 2019

(86) PCT No.: PCT/JP2019/008630
§ 371 (c)(1),
(2) Date: Feb. 20, 2020

(87) PCT Pub. No.: WO2019/188045
PCT Pub. Date: Oct. 3, 2019

(65) Prior Publication Data
US 2020/0172158 A1 Jun. 4, 2020

(30) Foreign Application Priority Data
Mar. 28, 2018 (JP) .............................. JP2018-062921

(51) Int. Cl.
*B62D 5/07* (2006.01)
*E02F 9/22* (2006.01)
(52) U.S. Cl.
CPC ................ *B62D 5/07* (2013.01); *E02F 9/225* (2013.01); *E02F 9/2246* (2013.01); *E02F 9/2267* (2013.01)

(58) Field of Classification Search
CPC .......... B62D 5/07; E02F 9/2246; E02F 9/225; E02F 9/2267
See application file for complete search history.

(56) References Cited

U.S. PATENT DOCUMENTS 4,663,936 A * 5/1987 Morgan .................... B62D 5/07
137/115.06

FOREIGN PATENT DOCUMENTS

JP 11-181823 A 7/1999
JP 2000-027765 A 1/2000
(Continued)

OTHER PUBLICATIONS

International Search Report of PCT/JP2019/008630 dated May 14, 2019.

*Primary Examiner* — F Daniel Lopez
*Assistant Examiner* — Daniel S Collins
(74) *Attorney, Agent, or Firm* — Mattingly & Malur, PC (57) ABSTRACT

The operability can be improved when the rotational speed of the engine is low and the working device actuator and the steering actuator are operated in a combined manner, while the configuration of prioritizing the operation of the steering actuator is maintained. A control device (70) included in a wheel loader (1) determines whether a working device (4) is in load lifting operation or not based on the pressure that is between a working device directional switching valve (44) and an orifice (45) and is detected by a pressure sensor (71), and reduces the opening area of a steering control valve (37) when determining that the rotational speed of an engine (14) detected by a rotational speed sensor (72) is equal to or less than a predetermined threshold (Ns) and a working device is in the load lifting operation.

5 Claims, 7 Drawing Sheets

(56) References Cited

FOREIGN PATENT DOCUMENTS

| | | |
|---|---|---|
| JP | 2008-155897 A | 7/2008 |
| JP | 2009-184618 A | 8/2009 |
| JP | 2013-119358 A | 6/2013 |
| JP | 2015-127164 A | 7/2015 |

* cited by examiner

FIG. 7

WHEEL LOADER

TECHNICAL FIELD

The present invention relates to a wheel loader.

BACKGROUND ART

As a conventional art in this technical field, "a wheel loader configured to include a hydraulic circuit for a steering actuator and a hydraulic circuit for a working device actuator, wherein the hydraulic circuits share a common hydraulic pressure source, and supply of pressure oil from the hydraulic pressure source to the hydraulic circuit for the steering actuator is prioritized over that to the hydraulic circuit for the working device actuator" is disclosed (for example, see Patent Literature 1).

CITATION LIST

Patent Literature

Patent Literature 1: Japanese Patent Laid-Open No. 2008-155897

SUMMARY OF INVENTION

Technical Problem

Unfortunately, the conventional art described above has the configuration where when both an operation of the steering actuator and an operation of the working device actuator are performed at the same time, the operation of the steering actuator is prioritized. Accordingly, there is a problem in that particularly when the rotational speed of an engine is low, the flow rate for the working device actuator becomes insufficient, the load lifting rate in a lifting operation of a working device is difficult to be achieved, which is against intention of an operator.

The present invention has an object to provide a wheel loader that can improve operability when the rotational speed of an engine is low and a working device actuator and a steering actuator are operated in a combined manner, while maintaining the configuration of prioritizing the operation of the steering actuator.

Solution to Problem

To achieve the above object, an aspect of a wheel loader according to the present invention includes: a vehicle body; a steering actuator that steers the vehicle body; a working device attached to a front of the vehicle body; a working device actuator that operates the working device; a hydraulic pump that supplies pressure oil to the steering actuator and the working device actuator; an engine that drives the hydraulic pump; a steering directional switching valve that is provided between the steering actuator and the hydraulic pump, and switches a direction of pressure oil supplied to the steering actuator; a steering control valve that is provided between the steering directional switching valve and the hydraulic pump, and controls a flow rate of the pressure oil supplied to the steering actuator; a working device directional switching valve that is provided between the working device actuator and the hydraulic pump, and switches the direction of the pressure oil supplied to the working device actuator; a working device control valve that is provided between the working device directional switching valve and the hydraulic pump, and controls the flow rate of the pressure oil to the working device actuator; an orifice provided downstream of the working device directional switching valve, on a flow of the pressure oil; a rotational speed sensor that detects the rotational speed of the engine; a pressure sensor that detects a pressure between the working device directional switching valve and the orifice; and a control device that controls the steering control valve, wherein in a case where the rotational speed of the engine detected by the rotational speed sensor is equal to or less than a predetermined threshold, and the pressure detected by the pressure sensor is equal to or higher than a predetermined pressure, an opening area of the steering control valve is reduced.

Advantageous Effects of Invention

The wheel loader according to the present invention can improve the operability when the rotational speed of the engine is low and the working device actuator and the steering actuator are operated in a combined manner, while maintaining the configuration of prioritizing the operation of the steering actuator. Note that problems, configurations and advantageous effects other than those described above are clarified by the following description of embodiments.

DESCRIPTION OF EMBODIMENTS

Hereinafter, referring to the drawings, embodiments of wheel loaders that are examples of operation vehicles according to the present invention, are described. Note that in each embodiment, the same configuration elements are assigned the same symbols. Redundant description is omitted.

First Embodiment

Figure 1:
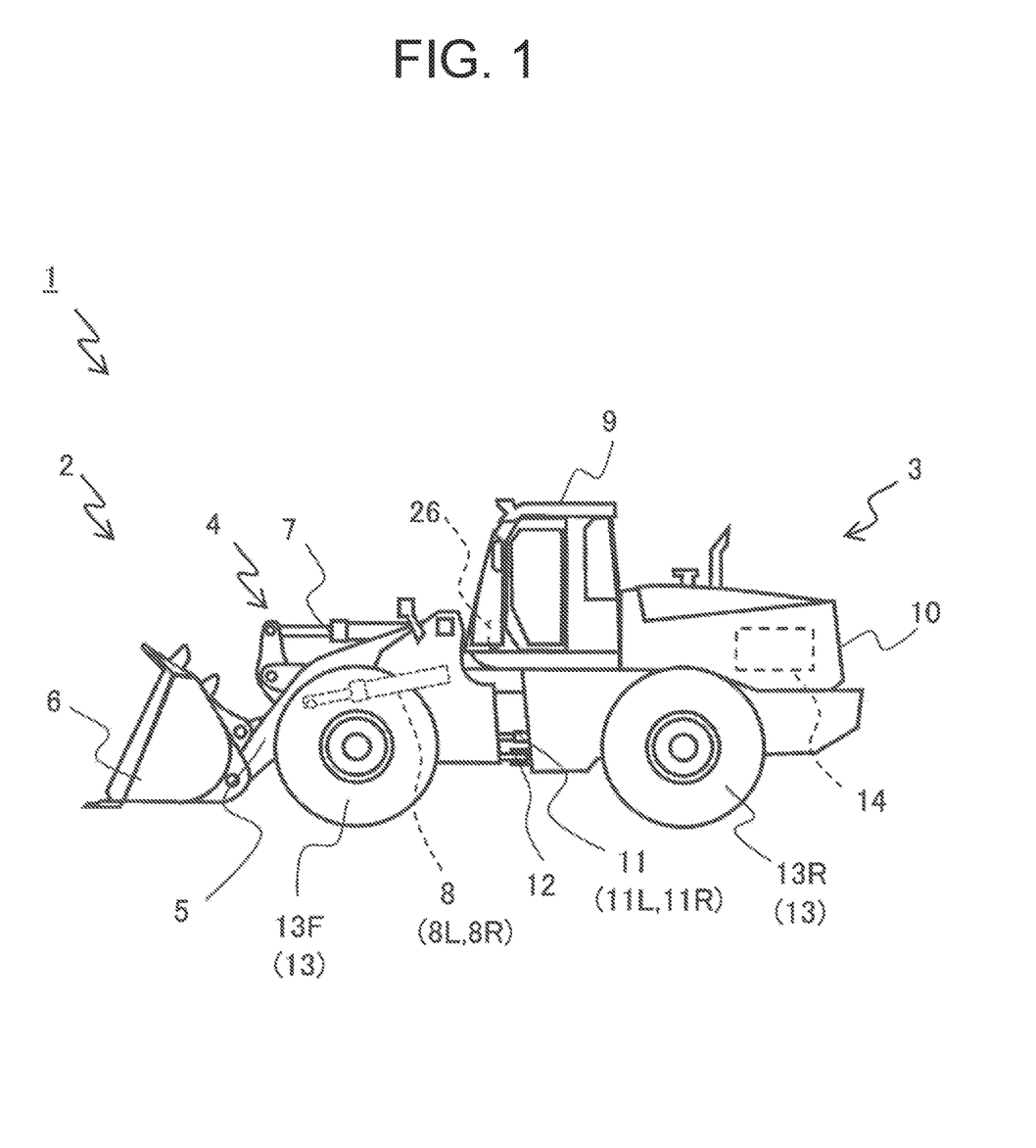
FIG. 1 is a side view of a wheel loader according to a first embodiment of the present invention.

FIG. 1 is a side view of a wheel loader 1 according to a first embodiment of the present invention. The wheel loader 1, which is an operation vehicle, includes: a front frame (vehicle body) 2 provided with a pair of lift arms 5, a bucket 6, front wheels 13F and the like; and a rear frame (vehicle body) 3 provided with an operating room 9, a machine room 10, rear wheels 13R and the like. An engine 14 is arranged in the machine room 10. The operating room 9 is provided with a bucket operating lever 24 for operating the bucket 6 (see FIG. 2), a lift arm operating lever 25 allowing the lift arms 5 (see FIG. 2) to be operated, an accelerator pedal 26 for adjusting the rotational speed of the engine 14 and the like. The front wheels 13F and the rear wheels 13R are also called wheels 13.

The pair of the lift arms 5 are driven by a pair of lift arm cylinders 8 (8L and 8R) to rotate in the vertical direction (depression and elevation). The bucket 6 is driven by a bucket cylinder 7 to rotate in the vertical direction (crowding or dumping). The pair of lift arms 5, the pair of lift arm cylinders 8, the bucket 6, and the bucket cylinder 7 constitute a front working device (working device) 4. The front frame 2 and the rear frame 3 are rotatably joined to each other by a center pin 12. Extension and retraction of the left and right pair of steering cylinders 11 (11L and 11R) bends the front frame 2 to the left and right with respect to the rear frame 3. Note that the pair of lift arm cylinders 8 and the bucket cylinder 7 correspond to "working device actuator" of the present invention.

Although not shown in FIG. 1, a bucket angle sensor 73 that detects the angle of the bucket 6, and a lift arm angle sensor 74 that detects the angle of the lift arms 5 are herein provided. Detection signals of the respective sensors 73 and 74 are output to a controller 70 (see FIG. 3). A torque converter and a transmission are connected to an output shaft of the engine 14. The rotation (not shown) of the engine 14 is transmitted to the transmission via the torque converter. The rotation of the output shaft of the torque converter is changed by the transmission. The changed rotation is transmitted to the wheels 13 via a propeller shaft and an axle, which allows the wheel loader 1 to travel. Note that an engine rotational speed sensor 72 that detects the number of engine revolutions is provided in proximity to the output shaft of the engine 14 (see FIG. 2).

[Hydraulic Drive System]

Figure 2:
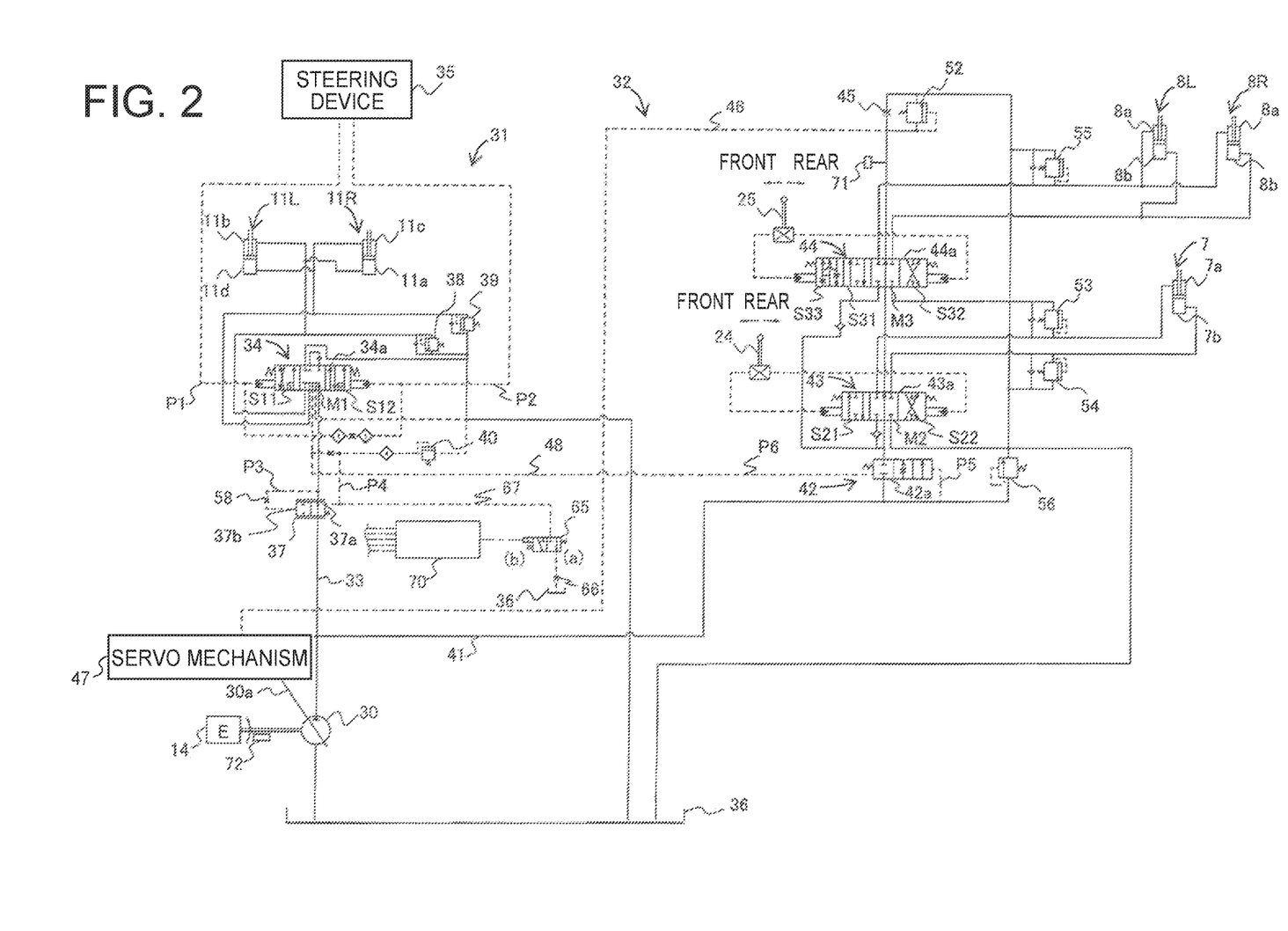
FIG. 2 shows a hydraulic drive system of the wheel loader shown in FIG. 1.

FIG. 2 shows a hydraulic drive system of the wheel loader 1 shown in FIG. 1. As shown in FIG. 2, the hydraulic drive system of the wheel loader 1 includes a hydraulic pump 30, a steering drive circuit 31, and a working device drive circuit 32. The hydraulic pump 30 is what is called a variable displacement hydraulic pump, and is joined to the engine 14. The hydraulic pump 30 is configured to be driven by the engine 14 to rotate, and discharge pressure oil having a high pressure, through rotation. The steering drive circuit 31 and the working device drive circuit 32 communicate with the hydraulic pump 30 in parallel, which allows pressure oil from the hydraulic pump 30 to flow through the steering drive circuit 31 and the working device drive circuit 32 in parallel.

<Steering Drive Circuit>

The steering drive circuit 31 includes a meter-in path 33 that communicates with the hydraulic pump 30. The meter-in path 33 is configured to allow pressure oil discharged from the hydraulic pump 30 to flow therethrough. The meter-in path 33 is provided with a steering directional switching valve 34. Pressure oil discharged from the hydraulic pump 30 is guided to the steering directional switching valve 34.

The steering directional switching valve 34 communicates with the steering cylinders 11L and 11R. The pressure oil guided to the meter-in path 33 is allowed to flow to the steering cylinders 11L and 11R via the steering directional switching valve 34. The steering directional switching valve 34 includes a main spool 34a. The main spool 34a moves and changes the position, thereby switching the direction of pressure oil, which is to flow to the steering cylinders 11L and 11R. At the steering directional switching valve 34, the degree of opening of the main spool 34a is adjusted in conformity with the position of the main spool 34a. The pressure oil at a flow rate according to the degree of opening flows to the steering cylinders 11L and 11R.

At the steering directional switching valve 34 configured as described above, the main spool 34a is connected to a steering device 35. The steering device 35 includes a rotationally operable steering handle (hereinafter called "handle"), not shown. First pilot oil and second pilot oil are output in response to the handle turning direction. The main spool 34a is configured to receive the pilot pressures P1 and P2 of the output first pilot oil and second pilot oil in resistive directions opposite to each other, and move from a neutral position M1 to a first offset position S11 by receiving the first pilot pressure P1, and move from the neutral position M1 to a second offset position S12 by receiving the second pilot pressure P2.

When the main spool 34a moves to the first offset position S11, the meter-in path 33 communicates with a bottom chamber 11a of the right steering cylinder 11R and with a rod chamber 11b of the left steering cylinder 11L, and a tank 36 communicates with a rod chamber 11c of the right steering cylinder 11R and with a bottom chamber 11d of the left steering cylinder 11L. Accordingly, the right steering cylinder 11R is extended and the left steering cylinder 11L is retracted, and the front frame 2 turns to the left with respect to the rear frame 3, thus switching the traveling direction.

On the other hand, when the main spool 34a moves to the second offset position S12, the meter-in path 33 communicates with the rod chamber 11c of the right steering cylinder 11R and with the bottom chamber 11d of the left steering cylinder 11L, and the tank 36 communicates with the bottom chamber 11a of the right steering cylinder 11R and with the rod chamber 11b of the left steering cylinder 11L. Accordingly, the left steering cylinder 11L is extended and the right steering cylinder 11R is retracted, and the front frame 2 turns to the right with respect to the rear frame 3, thus switching the traveling direction.

The steering device 35 is configured to output the first pilot oil and second pilot oil having flow rates in response to the rotation rate of the handle. According to the flow rates of the first pilot oil and the second pilot oil, the first pilot pressure P1 and the second pilot pressure P2 increase. Increase in the first pilot pressure P1 and the second pilot pressure P2, in turn, increases the degree of opening of the main spool 34a, and increases the flow rates of the pressure oil flowing to the steering cylinders 11L and 11R via the steering directional switching valve 34. Accordingly, the steering cylinders 11L and 11R are extended and retracted at rates in response to the rotation rate of the handle, thus switching the traveling direction. To adjust the flow rates of the pressure oil flowing to the steering cylinders 11L and 11R, the steering drive circuit 31 includes a meter-in compensator (steering control valve) 37.

The meter-in compensator 37 intervenes upstream of the steering directional switching valve 34 on the meter-in path 33. An outlet pressure P4 of the steering directional switching valve 34 is input to one pressure receiver 37a of the meter-in compensator 37, and an inlet pressure P3 of the steering directional switching valve 34 is input to the other pressure receiver 37b of the steering directional switching valve 34. Note that the inlet pressure P3 is input to the meter-in compensator 37 via an orifice 58. The outlet pressure P4 of the steering directional switching valve 34 is a hydraulic pressure output according to the degree of opening of the main spool 34a, and increases with increase of the degree of opening of the main spool 34a. That is, the outlet pressure P4 of the steering directional switching valve 34 increases with increase in the pressure of the pressure oil flowing to the steering cylinders 11L and 11R. The meter-in compensator 37 receives such two pressures P3 and P4 in resistive directions opposite to each other. The meter-in compensator 37 is a flow rate control valve, and is configured to control the flow rate of the pressure oil flowing from the hydraulic pump 30 to the steering directional switching valve 34 according to the degree of opening in response to the differential pressure of the two pressures P3 and P4 (the differential pressure before and after the steering directional switching valve 34).

Furthermore, this embodiment includes: a path 67 allowing the one pressure receiver 37a of the meter-in compensator 37 and the tank 36 to communicate with each other; a directional solenoid valve 65 provided on the path 67; and an orifice 66 provided on the path 67 between the directional solenoid valve 65 and the tank 36. The directional solenoid valve 65 is held at a closed position (a) in an unexcited state. When the directional solenoid valve 65 is excited, this valve is switched to an opened position (b), thereby allowing the pressure receiver 37a and the tank 36 to communicate with each other. Consequently, when the directional solenoid valve 65 is in the unexcited state, the outlet pressure P4 of the steering directional switching valve 34 is applied in a direction of opening the meter-in compensator 37 (the state in FIG. 2). On the other hand, when the directional solenoid valve 65 is excited, the pressure oil flowing through the steering directional switching valve 34 flows through the path 67 sequentially in an order of the directional solenoid valve 65 and the orifice 66 and is returned to the tank 36. Consequently, the outlet pressure P4 of the steering directional switching valve 34 becomes lower than the pressure of the directional solenoid valve 65 in the unexcited state, and the force of acting in the direction of opening the meter-in compensator 37 is reduced. That is, when the directional solenoid valve 65 is excited (ON), the meter-in compensator 37 operates in the closing direction, and the opening area is reduced (the degree of opening is reduced). Accordingly, the pressure oil from the hydraulic pump 30 becomes resistant to flowing to the steering drive circuit 31. In other words, the pressure oil from the hydraulic pump 30 is facilitated to flow to the working device drive circuit 32.

The steering drive circuit 31 is provided with three relief valves 38 to 40. When the hydraulic pressure in a path that allows the steering directional switching valve 34 and the chambers 11a to 11d of the steering cylinders 11L and 11R to communicate with each other is equal to or higher than a predetermined pressure, the first and second relief valves 38 and 39 discharge pressure oil flowing through the path to the tank 36. When the outlet pressure P4 of the steering directional switching valve 34 is equal to or higher than a predefined setting pressure, the main relief valve 40 that is the third relief valve discharges, to the tank 36, the pilot oil that is to flow from the steering directional switching valve 34 to the meter-in compensator 37. That is, in case an abnormal pressure is caused in the circuit by an impact or the like to the steering cylinders 11L and 11R due to an external force, the relief valves 38 and 39 release pressure oil to prevent the pressure in the circuit from being equal to or higher than the predetermined pressure. The main relief valve 40 prevents the pressure in the steering circuit from being equal to or higher than the predetermined pressure during steering driving.

<Working Device Drive Circuit>

The working device drive circuit 32 includes a bleed-off path 41. The upstream side of the bleed-off path 41 communicates with the upstream side of the meter-in compensator 37 on the meter-in path 33. Accordingly, the pressure oil discharged from the hydraulic pump 30 guided to the meter-in path 33 and to the bleed-off path 41. On the bleed-off path 41, a bucket directional switching valve 43, a lift arm directional switching valve 44 and an orifice 45 intervene in this order from the upstream side. The downstream side of the orifice 45 communicates with the tank 36. Note that the bucket directional switching valve 43 and the lift arm directional switching valve 44 correspond to "working device directional switching valve" of the present invention.

The bucket directional switching valve 43 communicates with the bucket cylinder 7, and is configured to switch the flow of pressure oil on the bleed-off path 41 to the bucket cylinder 7 and drive the bucket cylinder 7. Specifically, the bucket directional switching valve 43 includes a bucket spool 43a. The bucket spool 43a is configured to be moved from a neutral position M2 to change its position by operation of the bucket operating lever 24 provided in the operating room 9 in the front and rear direction. By changing the position of the bucket spool 43a, the bucket directional switching valve 43 switches the direction of flow of pressure oil.

More specifically, when the bucket operating lever 24 is operated and the bucket spool 43a is moved from the neutral position M2 to a first offset position S21, pressure oil is guided to a rod chamber 7a of the bucket cylinder 7, the bucket cylinder 7 is retracted, and the bucket 6 is inclined downward (dumping). On the contrary, when the bucket operating lever 24 is operated and the bucket spool 43a is moved from the neutral position M2 to a second offset position S22, pressure oil is guided to a bottom chamber 7b of the bucket cylinder 7, the bucket cylinder 7 is extended, and the bucket 6 is inclined upward (crowding). When the bucket spool 43a is returned to the neutral position M2, the bleed-off path 41 and the bucket cylinder 7 are blocked from each other.

The bucket directional switching valve 43 configured as described above is a center-open directional switching valve. When the bucket spool 43a is at the neutral position M2, the bleed-off path 41 is opened, and the degree of opening is largest thereat. Movement of the bucket spool 43a from the neutral position M2 to the first and second offset positions S21 and S22 reduces the degree of opening of the bucket directional switching valve 43 (i.e., the degree of opening of the bleed-off path 41) in response to the amount of movement of the bucket spool 43a. Accordingly, the flow rate of pressure oil flowing downstream of the bucket directional switching valve 43 on the bleed-off path 41 decreases with increase in the operation amount of the bucket operating lever 24, and increases by returning the bucket operating lever 24 to the original position. The lift arm directional switching valve 44 intervenes downstream of the bucket directional switching valve 43 on the bleed-off path 41 that is opened and closed as described above.

The lift arm directional switching valve 44 communicates with a pair of lift arm cylinders 8L and 8R, and is configured to switch the flow of pressure oil on the bleed-off path 41 to the lift arm cylinders 8L and 8R to drive the lift arm cylinders 8L and 8R. Specifically, the lift arm directional switching valve 44 includes a lift arm spool 44a. The lift arm spool 44a is configured to be moved from a neutral position M3 to change its position by operation of the lift arm operating lever 25 provided in the operating room 9 in the front and rear direction. By changing the position of the lift arm spool 44a, the lift arm spool 44a switches the direction of flow of pressure oil.

More specifically, when the lift arm operating lever 25 is operated and the lift arm spool 44a is moved from the neutral position M3 to a first offset position S31, pressure oil is guided to a rod chamber 8a of each of the lift arm cylinders 8L and 8R, the lift arm cylinders 8L and 8R are retracted, and the bucket 6 is lowered. On the contrary, when the lift arm operating lever 25 is operated and the lift arm spool 44a is moved from the neutral position M3 to a second offset position S32, pressure oil is guided to a bottom chamber 8b of each of the lift arm cylinders 8L and 8R, the lift arm cylinders 8L and 8R are extended, and the bucket 6 is raised.

At the lift arm directional switching valve 44, further operation of the lift arm operating lever 25 can move the lift arm spool 44a from the first offset position S31 to a third offset position S33. At the third offset position S33, the rod chamber 8a and the bottom chamber 8b of each of the lift arm cylinders 8L and 8R communicate with the tank 36, the holding forces of the lift arm cylinders 8L and 8R disappear, and the bucket 6 is lowered by its own weight.

The lift arm directional switching valve 44 configured as described above is a center-open directional switching valve. When the lift arm spool 44a is at the neutral position M3, the bleed-off path 41 is opened, and the degree of opening is largest thereat. Movement of the lift arm spool 44a from the neutral position M3 to the first and second offset positions S31 and S32 reduces the degree of opening of the bleed-off path 41 in response to the amount of movement of the lift arm spool 44a. Accordingly, the flow rate of pressure oil flowing downstream of the lift arm directional switching valve 44 on the bleed-off path 41 decreases with increase in the operation amount of the lift arm operating lever 25, and increases by returning the lift arm operating lever 25 to the original position. On the bleed-off path 41 opened and closed as described above, the orifice 45 intervenes downstream of the lift arm directional switching valve 44.

The orifice 45 is disposed between the lift arm directional switching valve 44 and the tank 36 on the bleed-off path 41. The pressure oil having passed through the bucket directional switching valve 43 and the lift arm directional switching valve 44 is discharged to the tank 36 through the orifice 45. Accordingly, on the downstream side of the orifice 45, a pressure occurs according to the flow rate of the pressure oil having passed through the bucket directional switching valve 43 and the lift arm directional switching valve 44 and been guided to the orifice 45. A negative control path 46 communicates between the orifice 45 and the lift arm directional switching valve 44. The pressure caused upstream of the orifice 45 is guided as a tilt command signal to a servo mechanism 47 of the hydraulic pump 30 via the negative control path 46. Note that a pressure sensor 71 is provided between the lift arm directional switching valve 44 of the bleed-off path 41 and the orifice 45.

The hydraulic pump 30 is a variable displacement hydraulic pump as described above, and includes a swash plate 30a. The hydraulic pump 30 is configured to have a volume changed by tilting the swash plate 30a. The servo mechanism 47 controls the tilt angle of the swash plate 30a of the hydraulic pump 30 in conformity with the tilt command signal. Specifically, when the pressure of the tilt command signal increases, the servo mechanism 47 reduces the tilt angle of the swash plate 30a to reduce the volume of the hydraulic pump 30. Accordingly, the delivery flow rate of the hydraulic pump 30 decreases. On the other hand, when the pressure of the tilt command signal decreases, the servo mechanism 47 increases the tilt angle of the swash plate 30a to increase the volume of the hydraulic pump 30. Accordingly, the delivery flow rate of the hydraulic pump 30 increases.

Accordingly, in the working device drive circuit 32, the delivery flow rate of the hydraulic pump 30 is controlled in response to the flow rate through the orifice 45. That is, the delivery flow rate of the hydraulic pump 30 is controlled according to negative control. The working device drive circuit 32 includes a bleed-off compensator (working device control valve) 42, in order to adjust the flow rate of pressure oil that is discharged from the hydraulic pump 30 and flows to the steering drive circuit 31, that is, in order to control the flow rate of the pressure oil bled off from the hydraulic pump 30 to the bleed-off path 41.

The bleed-off compensator 42 is provided upstream of the bucket directional switching valve 43 on the bleed-off path 41. The bleed-off compensator 42 receives an inlet pressure P5 of the bleed-off compensator 42 and an outlet pressure P6 of the steering directional switching valve 34, as pilot pressures. The outlet pressure P6 and the inlet pressure P5 are received in resistive directions opposite to each other. The bleed-off compensator 42 is a flow rate control valve that includes a spool 42a. The spool 42a is configured to move to the position according to the differential pressure of the outlet pressure P6 and the inlet pressure P5. By the degree of opening according to the position of the spool 42a, the flow rate of the pressure oil bled off downstream of the bleed-off compensator 42 is controlled.

Between the steering drive circuit 31 and the working device drive circuit 32, a bypass path 48 is formed. The outlet pressure P6 of the steering directional switching valve 34 is guided by the bypass path 48 to the bleed-off compensator 42.

The working device drive circuit 32 configured as described above includes a plurality of relief valves 52 to 55. The first relief valve 52 is provided in parallel to the orifice 45 on the bleed-off path 41. When the upstream side of the orifice 45 becomes equal to or higher than a predetermined pressure, the pressure oil flowing therethrough is discharged to the tank 36 via the relief valve 52. The relief valves 53 to 55 respectively communicate to the path between the bucket directional switching valve 43 and the rod chamber 7a of the bucket cylinder 7, between the bucket directional switching valve 43 and the bottom chamber 7b of the bucket cylinder 7, and between the lift arm directional switching valve 44 and the rod chambers 8a of the lift arm cylinders 8L and 8R. When the hydraulic pressures on the paths become equal to or higher than respectively defined pressures, these three relief valves 53 to 55 discharge the pressure oil to the tank 36.

Furthermore, the working device drive circuit 32 includes a main relief valve 56. The main relief valve 56 is provided in parallel to the bleed-off compensator 42, and is configured to discharge pressure oil from the hydraulic pump 30 to the tank 36 when the delivery pressure of the hydraulic pump 30 becomes equal to or higher than a prescribed pressure. This main relief valve 56 can maintain the pressure of the pressure oil flowing from the hydraulic pump 30 to the working device drive circuit 32 to be equal to or lower than the prescribed pressure.

[Operation of Hydraulic Drive System]

In the hydraulic drive system configured as described above, the engine 14 rotationally drives the hydraulic pump 30 to thereby discharge the pressure oil from the hydraulic pump 30, and the pressure oil flows through the steering drive circuit 31 and the working device drive circuit 32 in parallel. In situations where the handle of the steering device 35 is not operated, the meter-in path 33 and the steering cylinders 11L and 11R are closed from each other by the steering directional switching valve 34, and the outlet pressure P4 of the steering directional switching valve 34 is low. Accordingly, the meter-in compensator 37 is operated so as to close the meter-in path 33, and the pressure oil flowing through the steering directional switching valve 34 is regulated.

On the other hand, in the working device drive circuit 32, reduction in the outlet pressure P6 of the steering directional switching valve 34 moves the spool 42a of the bleed-off compensator 42 in a direction of opening the bleed-off path 41, and allows the pressure oil to flow downstream of the spool 42a on the bleed-off path 41. When the bucket operating lever 24 or the lift arm operating lever 25 is operated in such situations, one of the spools 43a and 44a of the directional switching valves 43 and 44 that corresponds to the operated one of the levers 24 and 25 is moved from corresponding one of the neutral positions M2 and M3, and the pressure oil is guided to corresponding one of the cylinders 7 and 8. Accordingly, the bucket 6 is raised or lowered, or tilted, in response to the operated one of the levers 24 and 25. Movement of the spool 43a, 44a from the neutral position M2, M3 reduces the degree of opening of the bleed-off path 41, and reduces the flow rate through the orifice 45. Accordingly, the pressure of the tilt command signal decreases. Based on this tilt command signal, the servo mechanism 47 increases the tilt angle of the swash plate 30a of the hydraulic pump 30, and increases the delivery flow rate of the hydraulic pump 30. On the contrary, operation of the bucket operating lever 24 or the lift arm operating lever 25 is finished and the spool 43a or 44a is returned to the neutral position M2 or M3, the flow rate through the orifice 45 increases. Accordingly, the pressure of the tilt command signal increases. Based on this tilt command signal, the servo mechanism 47 reduces the tilt angle of the swash plate 30a of the hydraulic pump 30, and reduces the delivery flow rate of the hydraulic pump 30.

When the handle of the steering device 35 is operated, the main spool 34a of the steering directional switching valve 34 is moved from the neutral position M1 in response to the operation amount of the handle. Accordingly, the outlet pressure P4 of the steering directional switching valve 34 increases, and the meter-in compensator 37 moves in a direction of opening the meter-in path 33. Accordingly, the pressure oil from the hydraulic pump 30 is guided to the steering cylinders 11L and 11R via the steering directional switching valve 34, the steering cylinders 11L and 11R are extended and retracted, and the traveling direction of the wheel loader 1 is switched to a direction corresponding to the handle turning direction.

On the other hand, in the working device drive circuit 32, increase in the outlet pressure P6 of the steering directional switching valve 34 moves the spool 42a of the bleed-off compensator 42 in a direction of closing the bleed-off path 41, and regulates the flow rate of the pressure oil flowing downstream of the bleed-off compensator 42 on the bleed-off path 41. The regulation can reduce the flow rate of the pressure oil bled off from the meter-in path 33 to the bleed-off path 41, that is, the pressure oil is allowed to flow preferentially to the steering drive circuit 31 Accordingly, the steering cylinders 11L and 11R can be operated preferentially over the bucket 6.

The regulation of the flow rate of the pressure oil flowing downstream of the bleed-off compensator 42 reduces the flow rate upstream of the orifice 45, and reduces the pressure occurring upstream of the orifice 45. That is, the pressure of the tilt command signal decreases, and the delivery flow rate of the hydraulic pump 30 increases. Accordingly, pressure oil having a flow rate slightly higher than the flow rate required for the steering directional switching valve 34 is discharged from the pump, and the pressure oil is stably supplied to the steering cylinders 11L and 11R.

Subsequently, the pressure (P3) at the outlet of the meter-in compensator 37 continuously increases with increase in the degree of opening of the meter-in compensator 37. When the outlet pressure P4 of the steering directional switching valve 34 becomes equal to or higher than the setting pressure, the main relief valve 40 is opened, and the outlet pressure P4 is maintained to be equal to or less than the setting pressure. Accordingly, when the pressure at the outlet of the meter-in compensator 37 increases, the meter-in compensator 37 eventually moves in a direction of closing the meter-in path 33, and regulates the flow rate to the steering cylinders 11L and 11R. Accordingly, the maximum pressure of the pressure oil flowing to the steering cylinders 11L and 11R is regulated to the predetermined pressure in conformity with the setting pressure. The flow rate to the meter-in path 33 decreases and the flow rate to the bleed-off path 41 increases. Accordingly, the circuit pressure of the bleed-off path increases (the inlet pressure P5 of the bleed-off compensator 42 increases), which moves the spool 42a of the bleed-off compensator 42 in the opening direction. Consequently, the flow rate of the pressure oil bled off to the bleed-off path 41 increases. Accordingly, the flow rate from the hydraulic pump 30 to the meter-in compensator 37 is regulated to be less than a predetermined flow rate.

In the hydraulic drive system configured as described above, when the handle of the steering device 35 is operated in a state where the directional solenoid valve 65 is in the unexcited state, the pressure oil flows preferentially to the steering drive circuit 31. Irrespective of presence or absence of operation of the bucket 6, the steering cylinders 11L and 11R are moved in response to operation of the handle. Switching control of the directional solenoid valve 65, which is described below, causes the pressure oil to flow forcibly also to the working device drive circuit 32, and allows the load lifting operation to be stably performed.

[Electric Configuration of Hydraulic Drive System]

Figure 3:
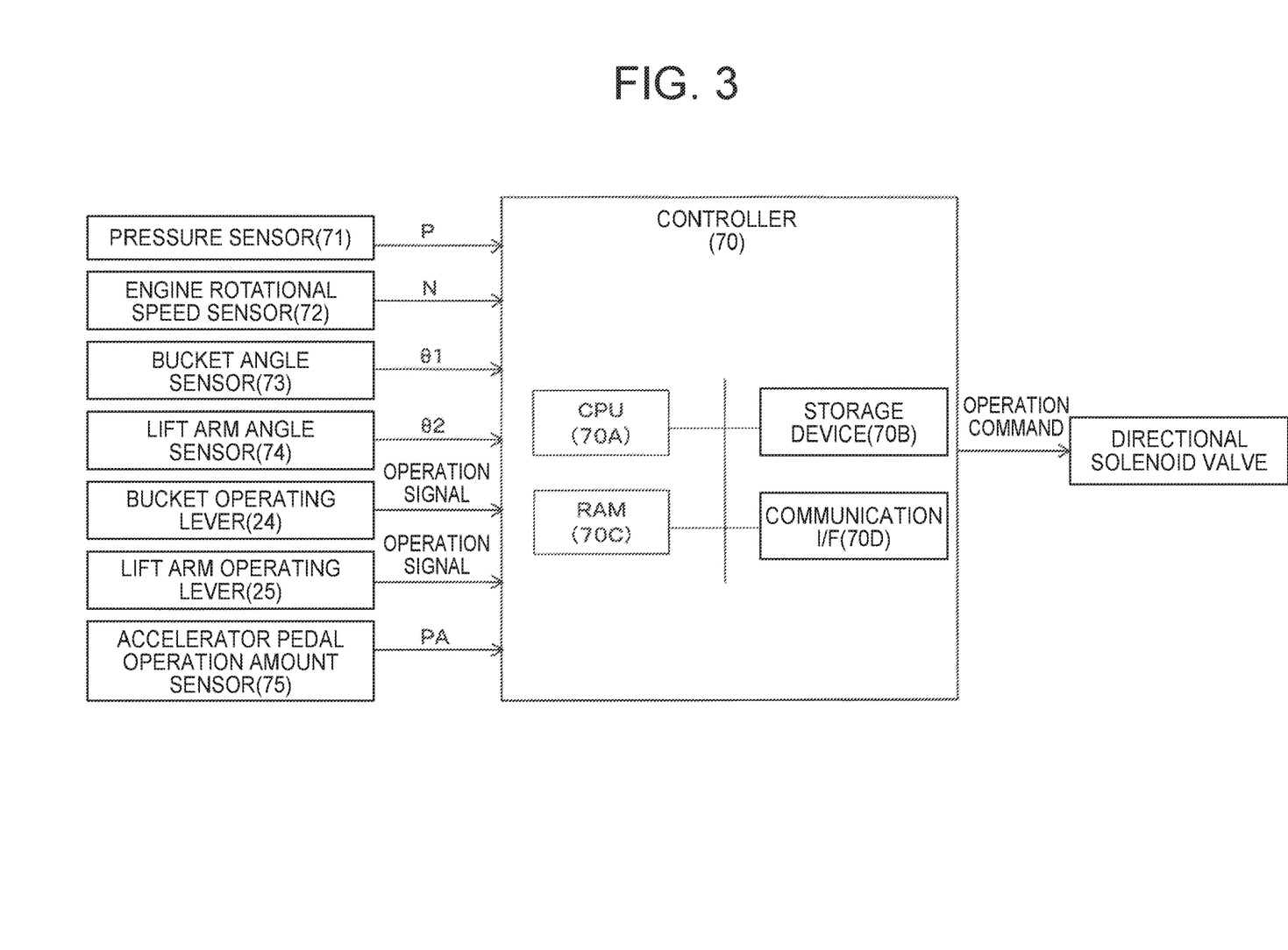
FIG. 3 shows an electric configuration of the hydraulic drive system shown in FIG. 2.

FIG. 3 shows an electric configuration of the hydraulic drive system shown in FIG. 2. As shown in FIG. 3, the controller 70 includes: hardware that includes a CPU 70A that performs various operations, a storage device 70B, such as a ROM and an HDD, storing programs for executing operations by the CPU 70A, a RAM 70C serving as an operation area when the CPU 70A executes the programs, and a communication interface (I/F) 70D that is an interface for data transmission and reception to and from other devices; and software that is stored in the storage device 70B and is executed by the CPU 70A. Various functions of the controller 70 are achieved by the CPU 70A loading, on the RAM 70C, the various programs stored in the storage device 70B and executing the programs.

The pressure sensor 71, the engine rotational speed sensor 72, the bucket angle sensor 73, the lift arm angle sensor 74, the bucket operating lever 24, the lift arm operating lever 25, and an accelerator pedal operation amount sensor 75 that detects the pedal stepping amount of the accelerator pedal 26 (the pedal stroke or pedal angle), are connected to the input side of the controller 70. The directional solenoid valve 65 is connected to the output side of the controller 70. In this embodiment, the controller 70 controls the operation of the directional solenoid valve 65 on the basis of the pressure P detected by the pressure sensor 71 and the number of engine revolutions N detected by the engine rotational speed sensor 72.

Figure 4:
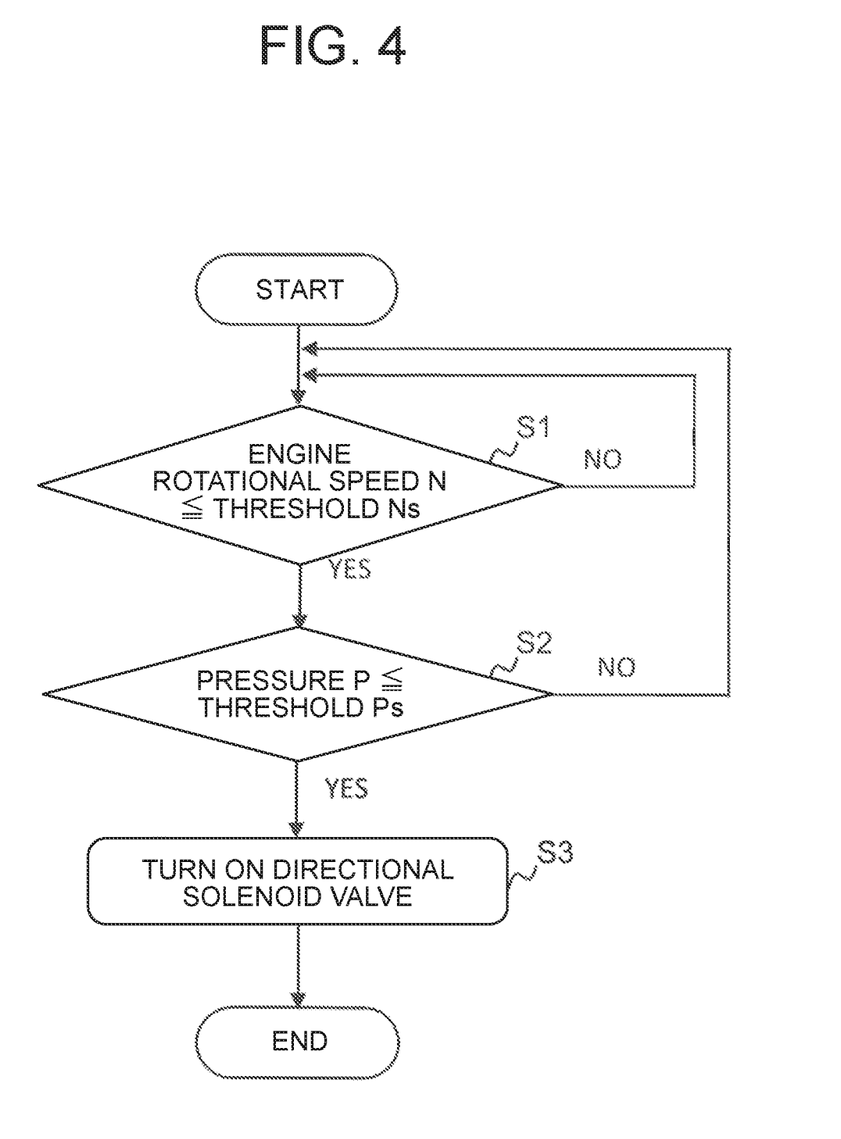
FIG. 4 is a flowchart showing procedures of a control process for a directional solenoid valve shown in FIG. 3.

Control procedures of the directional solenoid valve 65 are hereinafter described. FIG. 4 is a flowchart showing the procedures of control process for the directional solenoid valve 65. The control process for the directional solenoid valve 65 shown in FIG. 4 is started when a key switch of the engine 14 is turned ON and is periodically repeated until the key switch of the engine 14 is turned OFF, for example. After the process is started, the controller 70 determines whether the number of engine revolutions N is equal to or less than a threshold Ns or not (step S1). Here, the threshold Ns can be set to any value in a range where the number of engine revolutions can be regarded to be low. In this embodiment, the threshold Ns is set to the rotational speed at the low idling of the engine 14. The threshold Ns is preliminarily stored in the storage device 70B of the controller 70.

If the number of engine revolutions N is determined to be equal to or less than the threshold Ns (step S1/Yes), the controller 70 determines whether the pressure P is equal to or less than a threshold Ps or not (step S2). Here, the threshold Ps can be set to any value around which it can be determined to be in load lifting operation by the front working device 4. In this embodiment, for example, the pressure detected by the pressure sensor 71 when the lift arm operating lever 25 is operated by 50% from the initial position is obtained by calculation or measurement. The obtained pressure is preset as the threshold Ps. Note that the threshold Ps is preliminarily stored in the storage device 70B of the controller 70.

When the pressure P is equal to or less than the threshold Ps (step S2/Yes), the controller 70 outputs an action command (electric signal) for turning on (excites) the directional solenoid valve 65 (step S3). That is, when a specific condition that the number of engine revolutions N is equal to or less than the threshold Ns and the pressure P is equal to or less than the threshold Ps is satisfied, the controller 70 turns on the directional solenoid valve 65. When the directional solenoid valve 65 is excited, the meter-in compensator 37 is operated in the direction of closing the meter-in compensator 37. Accordingly, the flow rate of supplying the pressure oil from the hydraulic pump 30 to the steering drive circuit 31 is regulated, which can increase the flow rate of supply to the working device drive circuit 32. Consequently, even with the number of engine revolutions being in a low speed state, the front working device 4 can be driven to perform the load lifting operation while the steering operation is performed. That is, while the circuit configuration of prioritizing the operation of the steering cylinders 11L and 11R is maintained, even with the rotational speed of the engine 14 being in a low state, the operability in a case of combined operation of the bucket cylinder 7 and/or the lift arm cylinders 8L and 8R and the steering cylinders 11L and 11R can be improved, and the operation efficiency can be improved.

Second Embodiment

Figure 5:
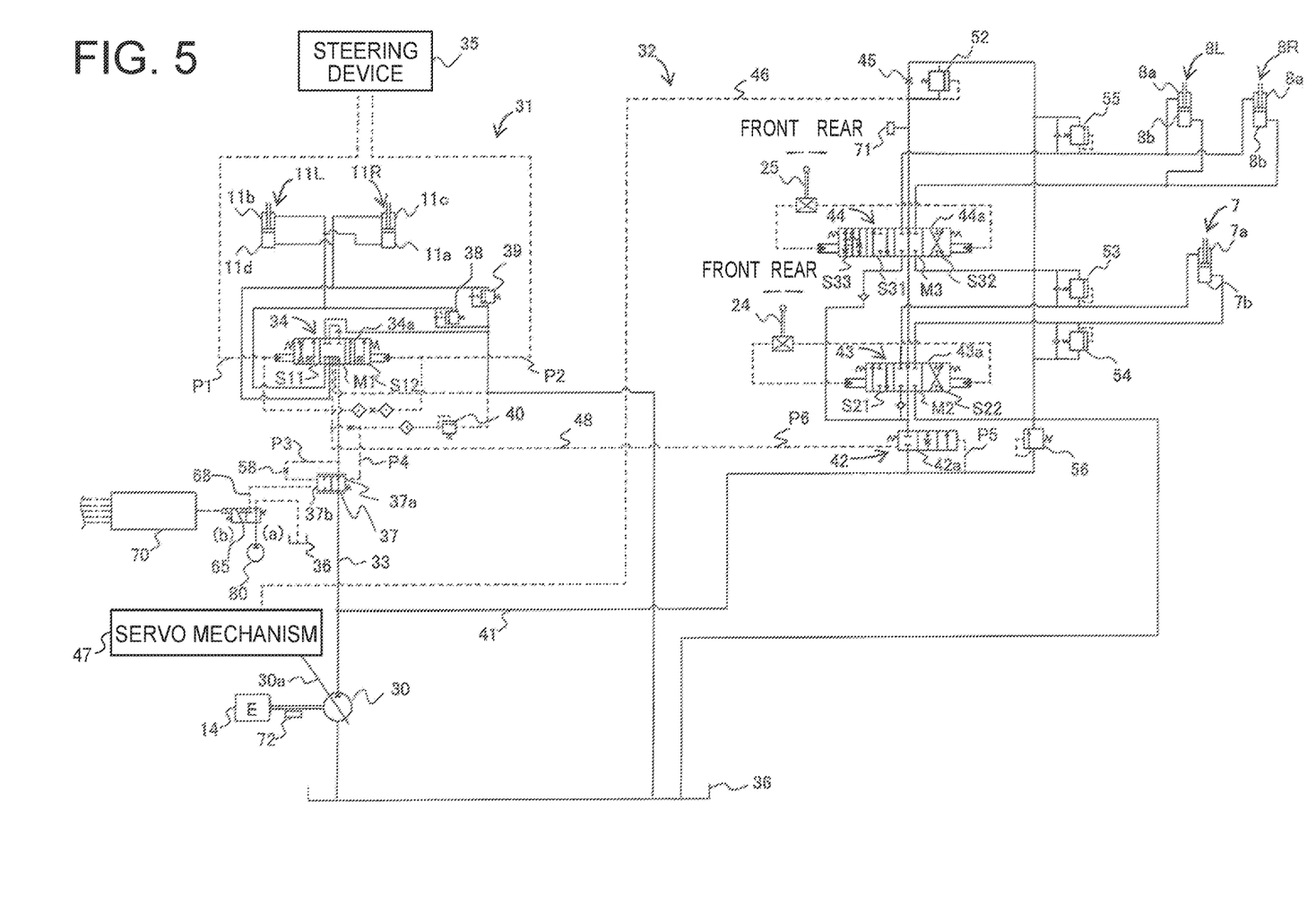
FIG. 5 shows a hydraulic drive system of a wheel loader according to a second embodiment.

Next, a hydraulic drive system according to a second embodiment of the present invention is described. FIG. 5 shows a hydraulic drive system of a wheel loader according to the second embodiment. The second embodiment includes: a path 68 allowing one pressure receiver 37b of the meter-in compensator 37 and a pilot pump (hydraulic pressure source) 80 to communicate with each other; and a directional solenoid valve 65 provided on the path 68. The directional solenoid valve 65 is held at the closed position (a) in the unexcited state, and the pressure oil discharged from the pilot pump 80 flows to the tank 36. Accordingly, when the directional solenoid valve 65 is in the unexcited state, the outlet pressure P4 of the steering directional switching valve 34 is applied in the direction of opening the meter-in compensator 37 (the state in FIG. 5).

On the other hand, when a specific condition similar to the first embodiment (the number of engine revolutions N≤threshold Ns, and pressure P≤threshold Ps: see FIG. 4) is satisfied and the directional solenoid valve 65 is excited, the directional solenoid valve 65 is switched from the closed position (a) to the opened position (b), thereby allowing the pressure receiver 37b and the pilot pump 80 to communicate with each other. Accordingly, the pressure oil discharged from the pilot pump 80 flows through the path 68 and is guided to the pressure receiver 37b, and the pressure applied onto the pressure receiver 37b is increased. When the pressure applied onto the pressure receiver 37b becomes higher than the outlet pressure P4 applied onto the pressure receiver 37a, the meter-in compensator 37 is operated in the closing direction. Accordingly, the opening area decreases (the degree of opening is reduced).

As described above, also in the second embodiment, on satisfaction of the specific condition, the meter-in compensator 37 is operated in the closing direction, which can increase the flow rate of supplying the pressure oil from the hydraulic pump 30 to the working device drive circuit 32. As a result, similar to the first embodiment, while the circuit configuration of prioritizing the operation of the steering cylinders 11L and 11R is maintained, even with the rotational speed of the engine 14 being in a low state, the operability in a case of combined operation of the bucket cylinder 7 and/or the lift arm cylinders 8L and 8R and the steering cylinders 11L and 11R can be improved, and the operation efficiency can be improved.

Note that instead of the pilot pump 80, for example, an accumulator or another hydraulic pump may be adopted as a hydraulic pressure source.

Third Embodiment

Figure 6:
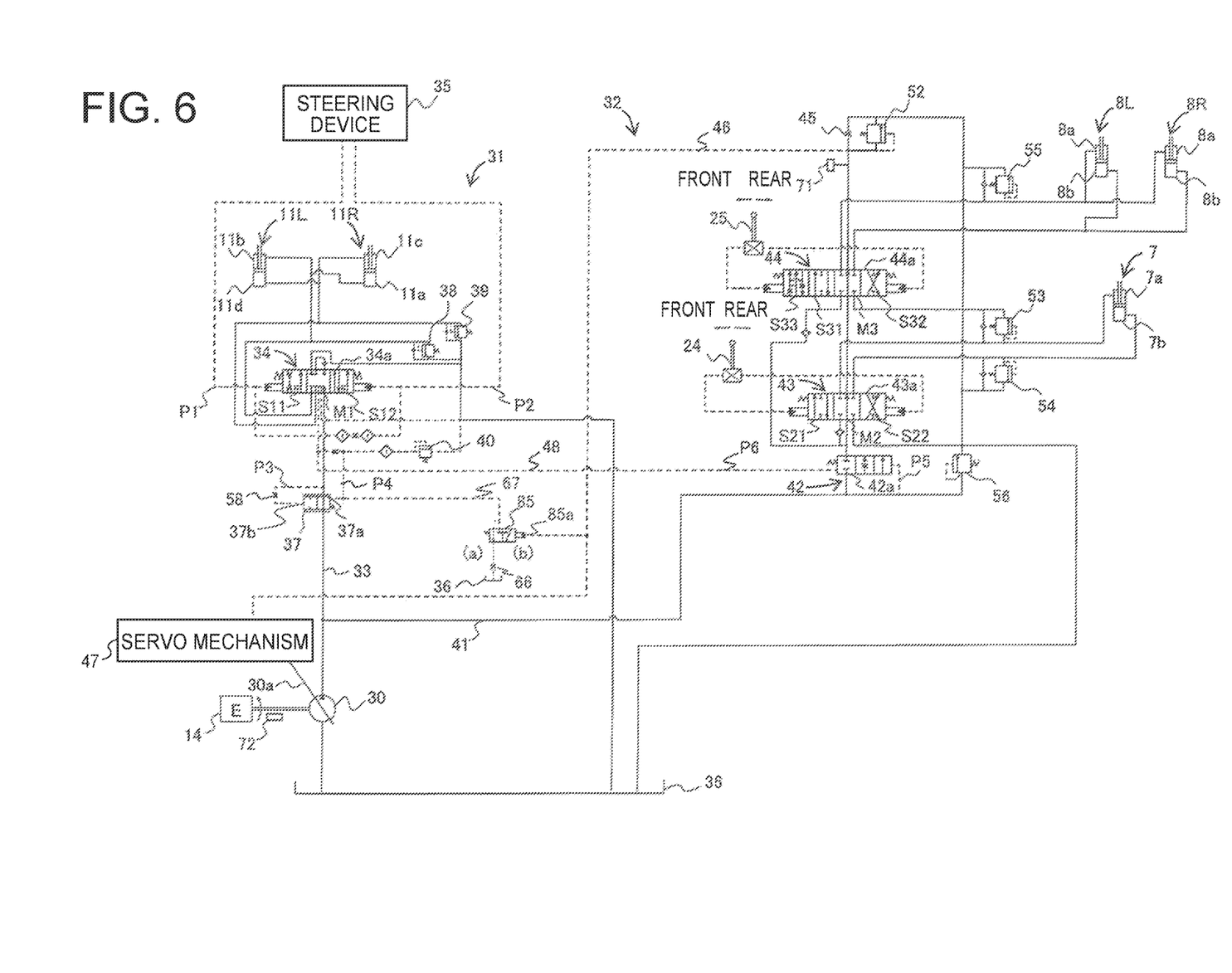
FIG. 6 shows a hydraulic drive system of a wheel loader according to a third embodiment.

Next, a hydraulic drive system according to a third embodiment of the present invention is described. FIG. 6 shows a hydraulic drive system of a wheel loader according to the third embodiment. The third embodiment includes: a path 67 allowing the one pressure receiver 37a of the meter-in compensator 37 and the tank 36 to communicate with each other; a hydraulic switching valve 85 provided on the path 67; and an orifice 66 provided on the path 67 between the hydraulic switching valve 85 and the tank 36.

A pressure receiver 85a of the hydraulic switching valve 85 communicates with the negative control path 46, thereby allowing the pressure oil flowing through the negative control path 46 to be guided thereto. Consequently, the hydraulic switching valve 85 operates between the closed position (a) and the opened position (b) in response to the pressure between the lift arm directional switching valve 44 and the orifice 45. In other words, the hydraulic switching valve 85 operates with a predetermined degree of opening according to the load of the load lifting operation. As the hydraulic switching valve 85 operates gradually from the closed position (a) to the opened position (b), the outlet pressure P4 applied onto the pressure receiver 37a of the meter-in compensator 37 gradually approaches the pressure of the tank 36, and the meter-in compensator 37 is operated in the closing direction. Accordingly, the pressure oil discharged from the hydraulic pump 30 can be supplied to the working device drive circuit 32.

As described above, according to the third embodiment, similar to the first embodiment, when the load lifting operation is performed by driving the front working device 4, the combined operation of the steering operation and the load lifting operation can be effectively performed even with the number of engine revolutions being low.

Fourth Embodiment

Figure 7:
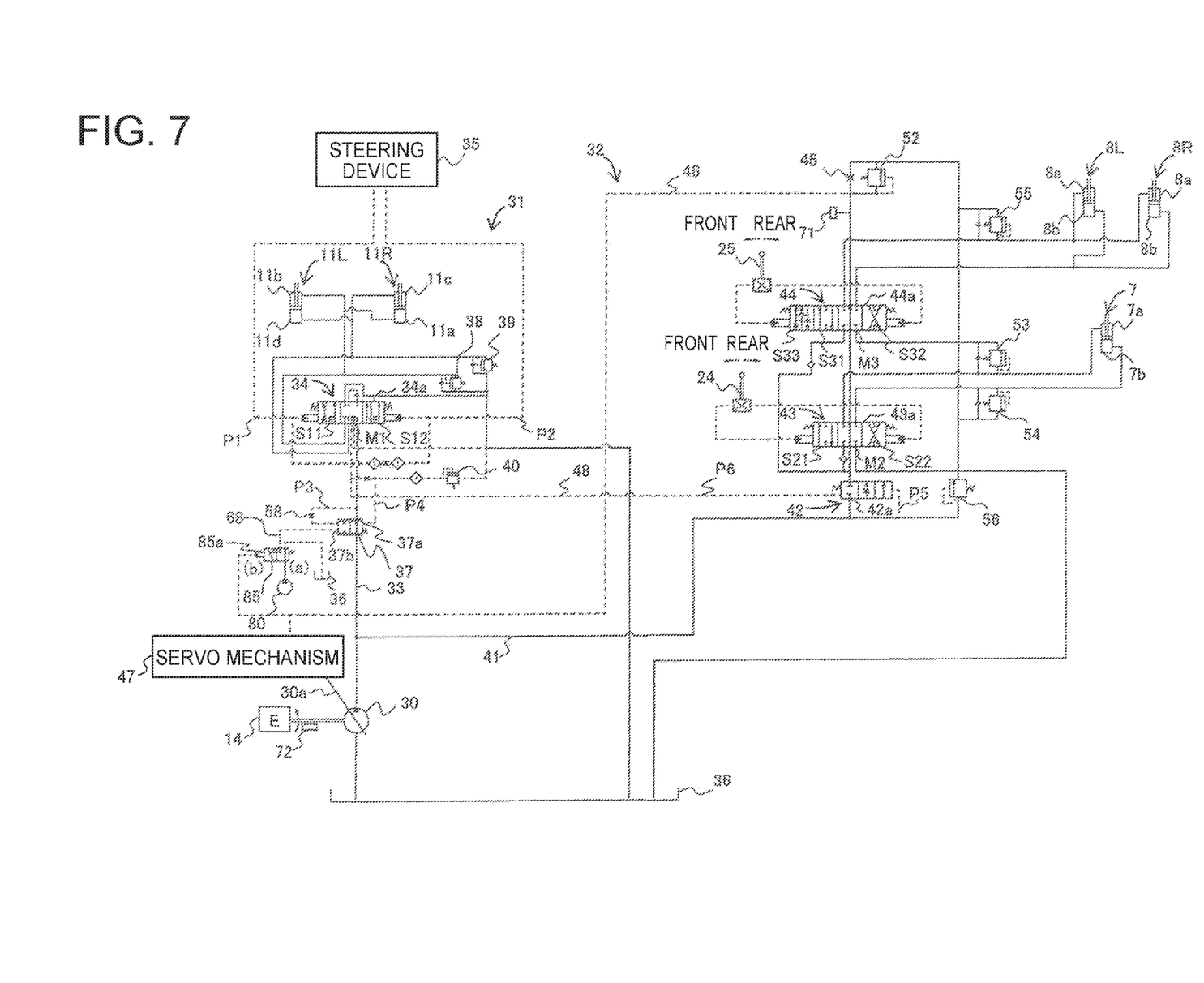
FIG. 7 shows a hydraulic drive system according to a fourth embodiment.

Next, a hydraulic drive system according to a fourth embodiment of the present invention is described. FIG. 7 shows the hydraulic drive system of a wheel loader according to the fourth embodiment. The fourth embodiment includes: a path 68 allowing one pressure receiver 37b of the meter-in compensator 37 and a pilot pump (hydraulic pressure source) 80 to communicate with each other; and a hydraulic switching valve 85 provided on the path 68. A pressure receiver 85a of the hydraulic switching valve 85 communicates with the negative control path 46, thereby allowing the pressure oil flowing through the negative control path 46 to be guided thereto.

Consequently, the hydraulic switching valve 85 operates between the closed position (a) and the opened position (b) in response to the pressure between the lift arm directional switching valve 44 and the orifice 45. In other words, the hydraulic switching valve 85 operates with a predetermined degree of opening according to the load of the load lifting operation. When the hydraulic switching valve 85 is at the closed position (a), the pressure oil discharged from the pilot pump 80 flows to the tank 36. Gradual operation of the hydraulic switching valve 85 from the closed position (a) to the opened position (b) applies the pressure of the pressure oil discharged from the pilot pump 80 onto the pressure receiver 37b of the meter-in compensator 37, and increases the pressure applied onto the pressure receiver 37b of the meter-in compensator 37 to be higher than the outlet pressure P4 applied onto the pressure receiver 37a, thereby operating the meter-in compensator 37 in the closing direction. Accordingly, the flow rate of supplying the pressure oil from the hydraulic pump 30 to the working device drive circuit 32 can be increased.

As described above, according to the fourth embodiment, similar to the second embodiment, when the load lifting operation is performed by driving the front working device 4, the combined operation of the steering operation and the load lifting operation can be effectively performed even with the number of engine revolutions being low.

The present invention is not limited to the embodiments described above. Various modification can be achieved in a range without departing from the gist of the present invention. All the technical items encompassed by the technical spirit described in the claims are targets of the present invention. The embodiments described above show preferable embodiments. Those skilled in the art can achieve various alternative examples, corrected examples, modification examples, or improved examples, from the content disclosed in this specification. These are encompassed by the technical scope described in the accompanied claims.

For example, in step S1 in FIG. 4, the detection signal of the engine rotational speed sensor 72 is used to determine whether the number of engine revolutions is low. Instead of this configuration, the detection signal of the accelerator pedal operation amount sensor 75 can be used. In step S2 in FIG. 4, the detection signal of the pressure sensor 71 is used to determine whether the load lifting operation is being performed or not. Instead of this configuration, the detection signals of the bucket angle sensor 73 and the lift arm angle sensor 74 may be used. Further alternatively, the operation signals of the bucket operating lever 24 and the lift arm operating lever 25 (the hydraulic pressure signal or the electric signal) may be used to determine whether the load lifting operation is being performed or not.

REFERENCE SIGNS LIST

1 Wheel loader
2 Front frame (vehicle body)
3 Rear frame (vehicle body)
4 Front working device (working device)
5 Lift arm
6 Bucket
7 Bucket cylinder (working device actuator)
8L, 8R Lift arm cylinder (working device actuator)
11L, 11R Steering cylinder
14 Engine
30 Hydraulic pump
34 Steering directional switching valve
36 Tank
37 Meter-in compensator (steering control valve)
37a, 37b Pressure receiver
42 Bleed-off compensator (working device control valve)
43 Bucket directional switching valve (working device directional switching valve)
44 Lift arm directional switching valve (working device directional switching valve)
45 Orifice
65 Directional solenoid valve
67 Path
68 Path
70 Controller
71 Pressure sensor
72 Engine rotational speed sensor (rotational speed sensor)
80 Pilot pump (hydraulic pressure source)
85 Hydraulic switching valve
85a Pressure receiver

The invention claimed is:

1. A wheel loader, comprising:
a vehicle body;
a steering actuator that steers the vehicle body;
a working device attached to a front of the vehicle body;
a working device actuator that operates the working device;
a hydraulic pump that supplies pressure oil to the steering actuator and the working device actuator;
an engine that drives the hydraulic pump;
a steering directional switching valve that is provided between the steering actuator and the hydraulic pump, and switches a direction of pressure oil supplied to the steering actuator;
a steering control valve that is provided between the steering directional switching valve and the hydraulic pump, and controls a flow rate of the pressure oil supplied to the steering actuator;
a working device directional switching valve that is provided between the working device actuator and the hydraulic pump, and switches the direction of the pressure oil supplied to the working device actuator;
a working device control valve that is provided between the working device directional switching valve and the hydraulic pump, and controls the flow rate of the pressure oil to the working device actuator;

an orifice provided downstream of the working device directional switching valve;
a rotational speed sensor that detects the rotational speed of the engine;
a pressure sensor that detects a pressure between the working device directional switching valve and the orifice; and
a control device that controls the steering control valve,
wherein in a case where the rotational speed of the engine detected by the rotational speed sensor is equal to or less than a predetermined threshold, and the pressure detected by the pressure sensor is equal to or higher than a predetermined pressure, an opening area of the steering control valve is reduced.

2. The wheel loader according to claim 1, further comprising:
a path that allows one of both pressure receivers of the steering control valve and a tank to communicate with each other; and
a directional solenoid valve provided on the path,
wherein the steering control valve is configured to be operated according to a differential pressure before and after the steering directional switching valve, by the pressure oil on an outlet side of the steering directional switching valve being guided to the one pressure receiver of the steering control valve, and by the pressure oil on an inlet side of the steering directional switching valve being guided to another pressure receiver of the steering control valve, and
in a case where the rotational speed of the engine detected by the rotational speed sensor is equal to or less than the predetermined threshold and the pressure detected by the pressure sensor is equal to or higher than the predetermined pressure, the control device opens the directional solenoid valve and allows the one pressure receiver and the tank to communicate with each other, to reduce the opening area of the steering control valve by returning the pressure oil applied on the one pressure receiver to the tank via the path.

3. The wheel loader according to claim 1, further comprising:
a path that allows one of both pressure receivers of the steering control valve and a hydraulic pressure source to communicate with each other; and
a directional solenoid valve provided on the path,
wherein the steering control valve is configured to be operated according to a differential pressure before and after the steering directional switching valve, by the pressure oil on an inlet side of the steering directional switching valve being guided to the one pressure receiver of the steering control valve, and by the pressure oil on an outlet side of the steering directional switching valve being guided to another pressure receiver of the steering control valve, and
in a case where the rotational speed of the engine detected by the rotational speed sensor is equal to or less than the predetermined threshold and the pressure detected by the pressure sensor is equal to or higher than the predetermined pressure, the control device opens the directional solenoid valve and allows the one pressure receiver and the hydraulic pressure source to communicate with each other, to reduce the opening area of the steering control valve by supplying the pressure oil from the hydraulic pressure source to the one pressure receiver via the path.

4. A wheel loader, comprising:
a vehicle body;
a steering actuator that steers the vehicle body;
a working device attached to a front of the vehicle body;
a working device actuator that operates the working device;
a hydraulic pump that supplies pressure oil to the steering actuator and the working device actuator;
an engine that drives the hydraulic pump;
a steering directional switching valve that is provided between the steering actuator and the hydraulic pump, and switches a direction of pressure oil supplied to the steering actuator;
a steering control valve that is provided between the steering directional switching valve and the hydraulic pump, and controls a flow rate of the pressure oil supplied to the steering actuator;
a working device directional switching valve that is provided between the working device actuator and the hydraulic pump, and switches the direction of the pressure oil supplied to the working device actuator;
a working device control valve that is provided between the working device directional switching valve and the hydraulic pump, and controls the flow rate of the pressure oil to the working device actuator;
and an orifice provided downstream of the working device directional switching valve; the wheel loader further comprising:
a path that allows one of both pressure receivers of the steering control valve and a tank to communicate with each other; and
a hydraulic switching valve that is provided on the path, and is operated by application of a pressure between the working device directional switching valve and the orifice onto a pressure receiver,
wherein the steering control valve is configured to be operated according to a differential pressure before and after the steering directional switching valve, by the pressure oil on an outlet side of the steering directional switching valve being guided to the one pressure receiver of the steering control valve, and by the pressure oil on an inlet side of the steering directional switching valve being guided to another pressure receiver of the steering control valve, and
the one pressure receiver and the tank are allowed to communicate with each other by operation of the hydraulic switching valve, to reduce an opening area of the steering control valve by returning the pressure oil applied onto the one pressure receiver to the tank via the path.

5. A wheel loader, comprising:
a vehicle body;
a steering actuator that steers the vehicle body;
a working device attached to a front of the vehicle body;
a working device actuator that operates the working device;
a hydraulic pump that supplies pressure oil to the steering actuator and the working device actuator;
an engine that drives the hydraulic pump;
a steering directional switching valve that is provided between the steering actuator and the hydraulic pump, and switches a direction of pressure oil supplied to the steering actuator;
a steering control valve that is provided between the steering directional switching valve and the hydraulic pump, and controls a flow rate of the pressure oil supplied to the steering actuator;
a working device directional switching valve that is provided between the working device actuator and the hydraulic pump, and switches the direction of the pressure oil supplied to the working device actuator;

a working device control valve that is provided between the working device directional switching valve and the hydraulic pump, and controls the flow rate of the pressure oil to the working device actuator;

and an orifice provided downstream of the working device directional switching valve; the wheel loader further comprising:

a path that allows one of both pressure receivers of the steering control valve and a hydraulic pressure source to communicate with each other; and a hydraulic switching valve that is provided on the path, and is operated by application of a pressure between the working device directional switching valve and the orifice onto a pressure receiver, wherein the steering control valve is configured to be operated according to a differential pressure before and after the steering directional switching valve, by the pressure oil on an inlet side of the steering directional switching valve being guided to the one pressure receiver of the steering control valve, and by the pressure oil on an outlet side of the steering directional switching valve being guided to another pressure receiver of the steering control valve, and the one pressure receiver and the hydraulic pressure source are allowed to communicate with each other by operation of the hydraulic switching valve, to reduce an opening area of the steering control valve by supplying the pressure oil from the hydraulic pressure source to the one pressure receiver via the path.

* * * * *